Figure 1:
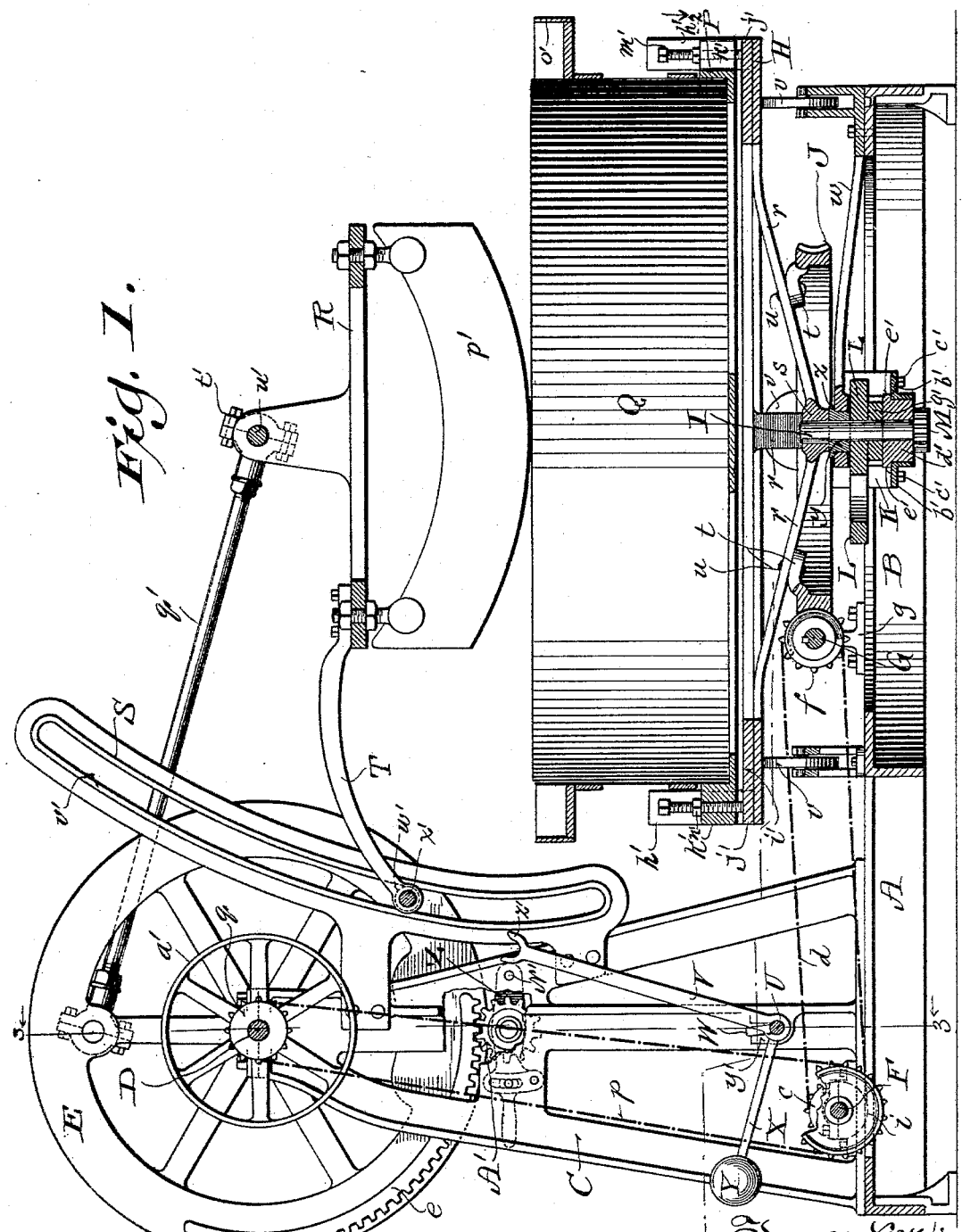

(No Model.) 4 Sheets—Sheet 1.

O. KIRSTEN.
MEAT CHOPPING MACHINE.

No. 584,000. Patented June 8, 1897.

Witnesses:
Geo. W. Young,
B. C. Rodoff.

Inventor:
Oscar Kirsten
By H. G. Underwood
Attorneys (No Model.) 4 Sheets—Sheet 2.
O. KIRSTEN.
MEAT CHOPPING MACHINE.
No. 584,000. Patented June 8, 1897.
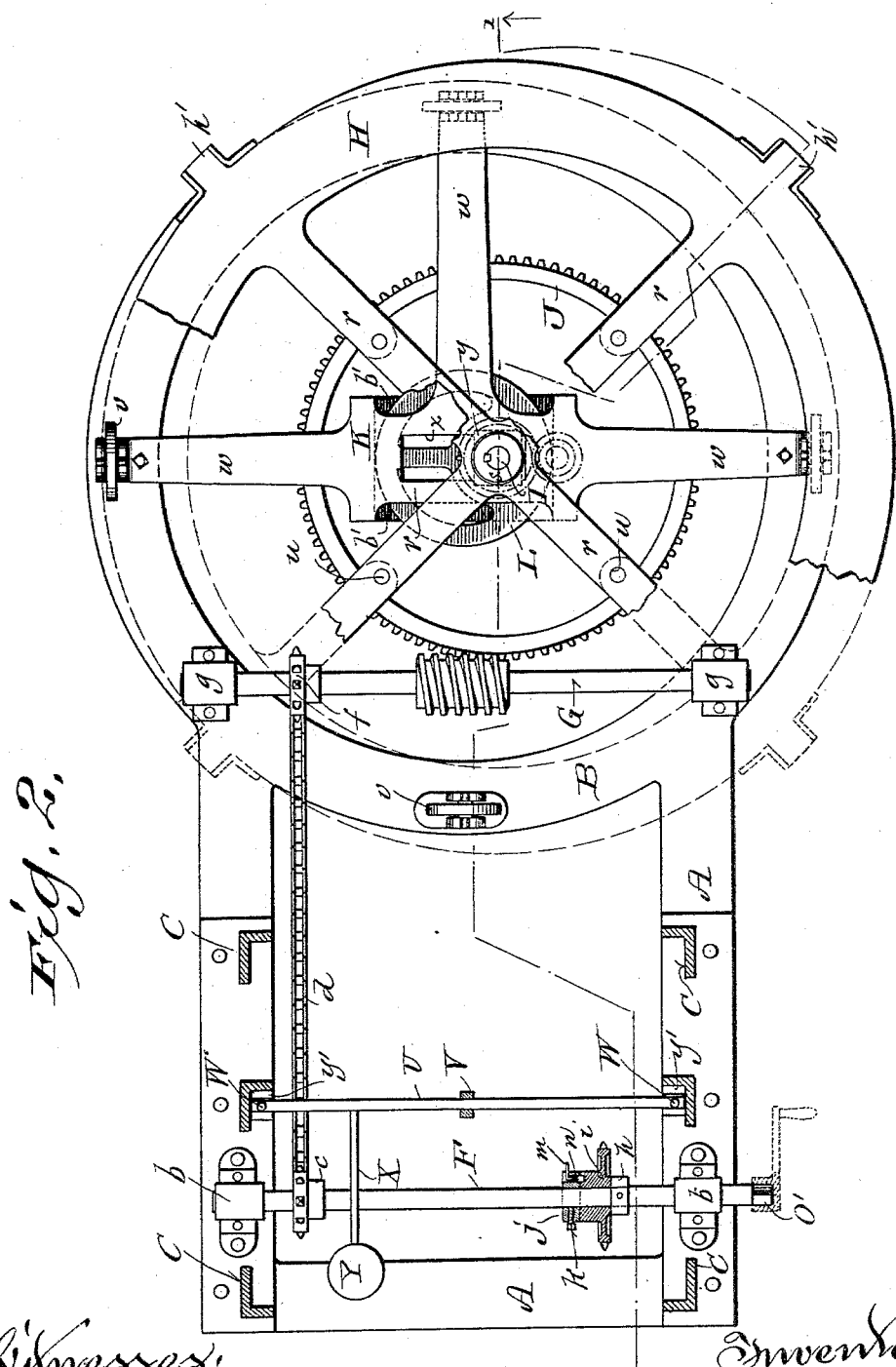

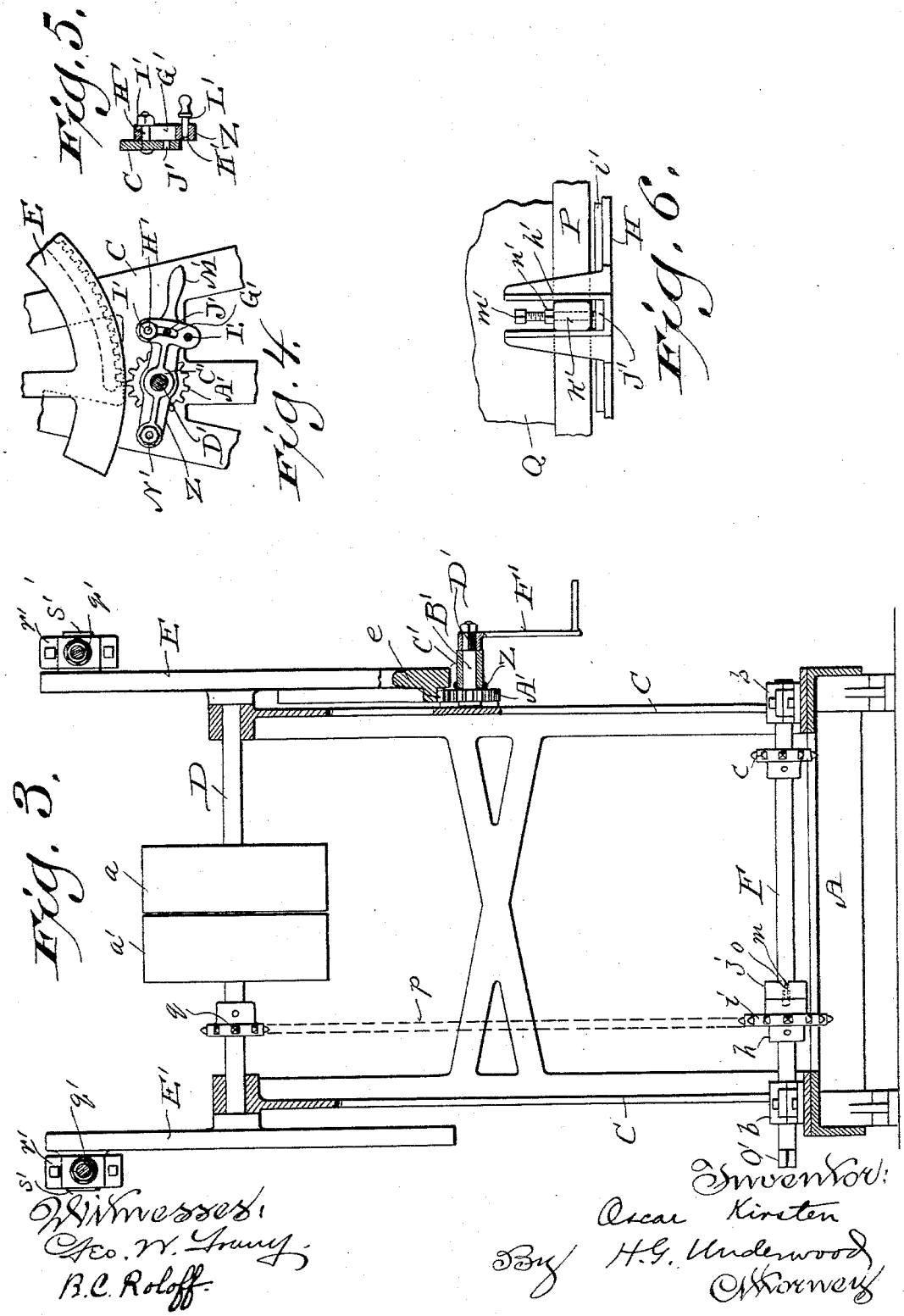

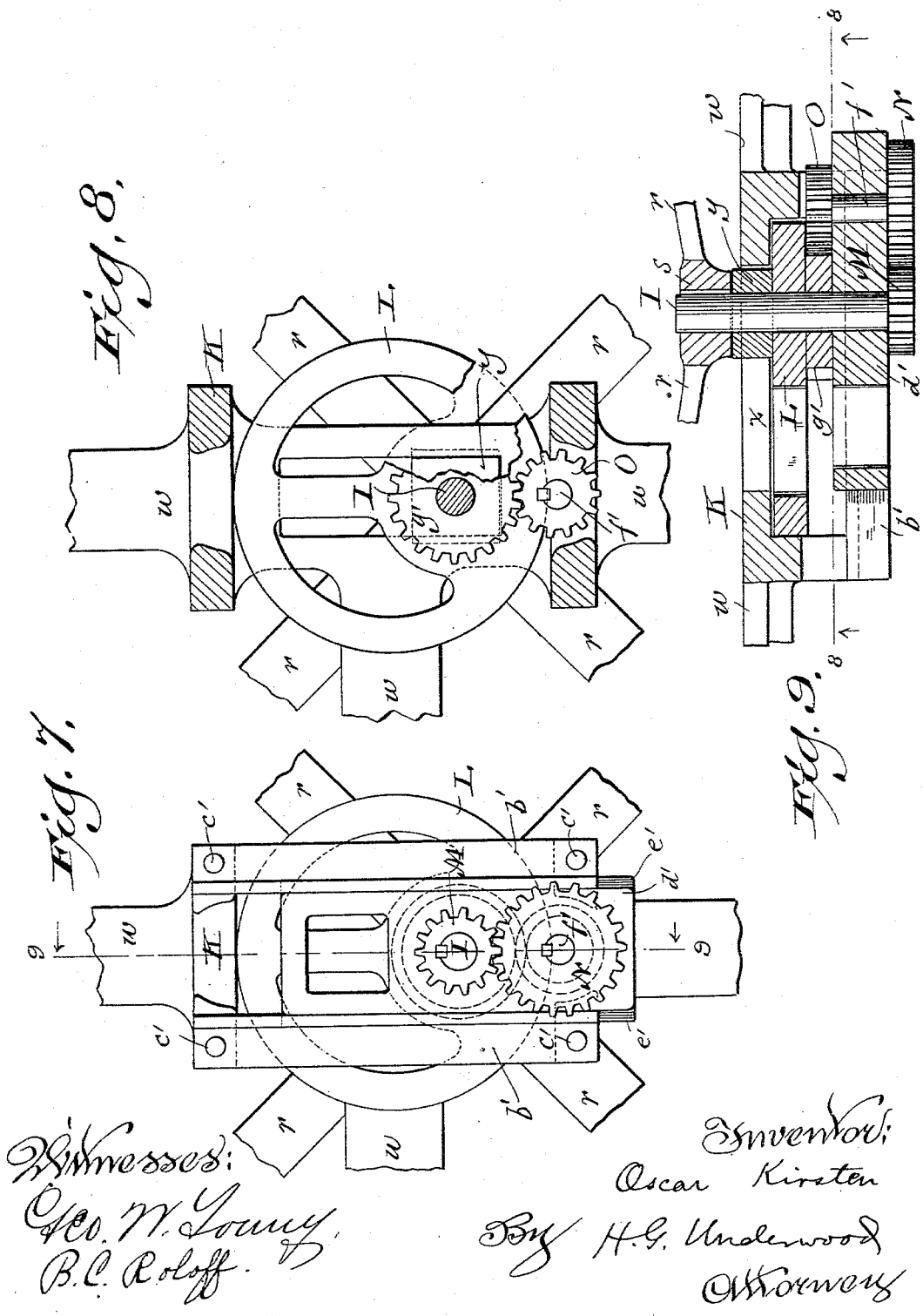

UNITED STATES PATENT OFFICE.

OSCAR KIRSTEN, OF MILWAUKEE, WISCONSIN, ASSIGNOR TO SAMUEL BIRKENWALD, OF SAME PLACE.

MEAT-CHOPPING MACHINE.

SPECIFICATION forming part of Letters Patent No. 584,000, dated June 8, 1897.

Application filed November 9, 1896. Serial No. 611,475. (No model.)

*To all whom it may concern:*

Be it known that I, OSCAR KIRSTEN, a citizen of the United States, and a resident of Milwaukee, in the county of Milwaukee and State of Wisconsin, have invented certain new and useful Improvements in Meat-Chopping Machines; and I do hereby declare that the following is a full, clear, and exact description thereof.

My invention relates to meat-chopping machines; and it consists in certain peculiarities of construction and combination of parts, as will be fully set forth hereinafter and subsequently claimed.

In the drawings, Figure 1 is a vertical longitudinal sectional view of a machine embodying my invention on the general line indicated by 1 1 in Fig. 2. Fig. 2 is a horizontal sectional view on the line indicated by 2 2 in Fig. 1 with portions broken away to show the construction beneath. Fig. 3 is a transverse vertical sectional view on the line indicated by 3 3 in Fig. 1. Figs. 4, 5, and 6 are detail views. Fig. 7 is an under side view, on an enlarged scale, illustrating certain details of the mechanism for shifting the block. Fig. 8 is a detail sectional view on the line indicated by 8 8 in Fig. 9. Fig. 9 is a detail sectional view on the line indicated by 9 9 in Fig. 7.

Referring to the drawings, A B represent, respectively, the rectangular and circular portions of the base of my machine, and rising from the side pieces of the former part there are standards C C, in the upper ends of which is suitably journaled the power-shaft D, having thereon fast and loose pulleys $a$ $a'$ and carrying at its ends the wheels E E', the wheel E carrying a segmental toothed rack-bar $e$ on the inner face of its rim. Journaled in boxes $b$ $b$ on the base A is a transverse shaft F, having near one end a small sprocket-wheel $c$, fast thereon, which connects by a sprocket-chain $d$ with a like sprocket-wheel $f$, fast on a transverse worm-shaft G, journaled in boxes $g$ $g$ on the base B. The shaft F near its opposite end is provided with a collar $h$, fast thereon, and next this with a loose sprocket-wheel $i$, and next this with a clutch-sleeve $j$, made fast to the shaft by a set-screw $k$. The clutch-sleeve $j$ and hub of the sprocket-wheel $i$ are each provided with corresponding perforations to receive a clutch-pin $m$, whose inner end is normally held by a spring $n$ in the perforation in the hub of the sprocket-wheel $i$, so that the said sprocket-wheel will revolve with the shaft F, the outer end of said clutch-pin $m$ being bent at a right angle for engagement with a cam edge $o$ on the clutch-sleeve $j$, so that when desired the said pin may thereby be withdrawn from engagement with the hub of the sprocket-wheel $i$, whereby the said sprocket-wheel $i$ will be loose on the said shaft. A sprocket-chain $p$ connects this sprocket-wheel $i$ with another sprocket-wheel $q$, fast on the described power-shaft D.

H is a wide flat annulus having downwardly-extending spokes $r$ and a hub $s$, the whole forming a horizontal wheel, to the hub of which is keyed a vertical shaft I. J is a worm-wheel suspended by lugs $t$ and bolts $u$ from the said spokes $r$ and in engagement with the worm on the shaft G. The annulus H is supported on upright antifriction-wheels $v$ $v$ $v$ $v$, one of which is supported in bearings secured directly to the circular base B, while the other three are supported in like bearings on the outer ends of three arms $w$ $w$ $w$, secured to said base, the said arms extending from a box or housing K of peculiar construction. The top of this box is formed with an oblong square-walled slot $x$ therein, in which is fitted a sliding block $y$, which has shouldered edges $z$ $z$ at the top overlapping and resting upon the side walls of said slot, and said block $y$ is further vertically perforated to enable the vertical shaft I to pass therethrough.

L is an eccentric-wheel journaled on the shaft I and confined between the inner end walls of the box K, whose sides are open for the free movement of said eccentric. The bottom of the box is formed of two parallel angle-plates $b'$ $b'$, bolted to the ends of the box, as shown at $c'$ $c'$, and at such a distance apart as to leave a channel between their vertical portions for the reception of another sliding block $d'$, having shouldered upper edges $e'$ $e'$ overlapping and resting upon the horizontal portions of the said angle-plates $b'$ $b'$, and this block $d'$ is likewise vertically perforated for the passage therethrough of the shaft I.

M is a pinion keyed to the bottom of the shaft I below the block $d'$, which pinion meshes with another and larger pinion N on the lower end of a short vertical shaft $f'$, journaled in another vertical perforation in the sliding block $d'$, and carrying at its upper end, just above said block, another and smaller pinion O in mesh with a pinion $g'$, rigidly secured to the eccentric L.

At intervals around its periphery the annulus H is provided with upright vertical guide-sockets $h'$, (best shown in detail in Fig. 6,) and another annulus $i'$ rests on the annulus H and has projections $j'$ fitting in between the upright walls of the guide-sockets $h'$, whereby the annulus $i'$ is kept in place on said annulus H.

P is a circular disk with a vertical circumferential flange forming an annular angle-plate, and from the vertical flange thereof there project guide-lugs $k'$, fitting within the guide-sockets $h'$, and having vertical screw-threaded bores therethrough for the reception of adjusting-screws $m'$, by means of which the disk P is adjusted in height above the annulus below to compensate for wear upon the meat-block Q, supported upon said disk P in use, the said adjusting-screws $m'$ being fitted with set-nuts $n'$, and the block Q being provided near its top with an annular trough $o'$ to catch any small pieces of meat that fall off its top surface during the operation of chopping.

R is the knife-frame, carrying a gang of knife-blades $p'$, said frame R being linked to the wheels E E' by the pitman-rods $q'$ $q'$ connected to suitable boxes $r'$ $r'$ on studs $s'$ $s'$ on said wheels and like boxes $t'$ on a shaft $u'$, journaled in said knife-frame. Bolted to the standards C C are guides S, having arc-shaped slots $v'$ therein for the reception of rollers or sleeves $w'$ on the ends of a transverse rod $x'$, which unites the ends of arms T, whose other ends are bolted to the knife-frame R. Journaled in suitable open bearings $y'$ $y'$, formed on the inner sides of the central upright portions of the standards C C, is a rock-shaft U, to the center of which is secured an upward-extending arm V, terminating in a fork $z'$ for the reception, at the proper times, of the transverse rod $x'$ of the knife-frame, as hereinafter explained.

W W are stops on the ends of the rock-shaft U for engagement with the walls of the open bearings $y'$ $y'$, and X is an arm extending outward from the rock-shaft U, and provided with a weight Y at its ends.

Just below the wheel E the adjacent standard C has pivoted thereto a lever Z. A' is a pinion whose teeth are adapted to mesh, when desired, with those on the segment $e$ on said wheel E, the said pinion having a shaft B' keyed thereto and journaled in a sleeve-like casting C' on said lever, and the end of said shaft B' being squared, as shown at D', to receive a crank F', the extreme end of the shaft B' being screw-threaded and fitted with a nut to keep the crank in place. The end of the lever Z has an arc-shaped slot G' formed therein, and a bolt H' passes through this slot and the standard C and has a nut I' on its end.

J' is a perforation in the standard C, and K' a like perforation in the end of the lever Z below the slot G', said perforations being for the reception of a locking-pin L'. M' is a handle at the free end of said lever, and N the pivot which holds the other end of said lever to the standard C.

The operation of my machine is as follows: When the meat to be chopped is placed upon the top of the block Q, the pinion A' on the lever Z must be free from engagement with the toothed segment $e$ on the wheel E, or, in other words, in the position shown in Fig. 5. Power is applied to the power-shaft D by a belt (not shown) on the fast pulley on said shaft and the wheels E E' revolve, thereby operating the knife-frame R and blades $p'$, thereto attached, by means of the pitman-rods $q'$ and arms T. The latter arms are controlled by the arc-slotted guides S, and the result is a rocking motion of the knife-frame. Power to operate the meat-block Q is transmitted from the power-shaft D, through sprocket-wheel $g$, sprocket-chain $p$, and sprocket-wheel $i$, to the shaft F, (when the said sprocket-wheel $i$ is clutched to said shaft F by clutch-sleeve $j$ and clutch-pin $m$, as already described,) and from sprocket-wheel $c$ on shaft F and sprocket-chain $d$ to sprocket-wheel $f$ on the worm-shaft G, the worm on said shaft meshing with the worm-wheel J, which latter, as already described, is rigidly connected to the annulus H. By reason of the described gearing below the meat-block Q the eccentric-wheel L, revolving within its limits in the box or housing K, will cause a transverse lateral travel back and forth of the annulus H in addition to its slow revolution caused by the engagement of the worm on shaft G with the worm-wheel J, this lateral reciprocation being permitted by the described sliding blocks in the box or housing K, so that all portions of the top surface of the meat-block Q come under the rocking cut of the blades $p'$, thereby finely subdividing the meat on said block.

When it is desired to clean the surface of the block, the knives have to be raised. To accomplish this, the power-belt is shifted to the loose pulley on shaft D and the forked arm V is tilted toward the block from the position shown in Fig. 1 until the forked end $z'$ of said arm is in the path of the transverse rod $x'$ of the knife-frame, so that said rod will rest in said fork. The lever Z is raised from the position shown in Fig. 5 into the position shown in Fig. 1, with the teeth of the pinion A' and segment $e$ in mesh, said lever being held in this position by pushing the locking-pin L' through the perforation K' in the lever into the perforation J' in the standard C. It is then only necessary to turn the crank F', which will partly revolve the wheel E till the limit of the segment e is reached, which will raise the knife-frame and carry the boxes r' r' and connected ends of the pitman-rods over beyond the center and hold them there with the knives raised and free from the block. When it is desired to turn the block Q, with the knives thus raised, the clutch-pin m is withdrawn from its seat in the hub of the sprocket-wheel i and the bent arm of said pin is moved along the cam edge o of the clutch-sleeve j and thus held against the force of the spring n, and the said sprocket-wheel i is thus loose on the shaft F. This shaft has a squared projecting end O', and a crank is applied thereto, as shown in dotted lines in Fig. 2, and then the block Q can be turned by hand as desired and said block and the knives readily cleaned.

Having thus described my invention, what I claim as new, and desire to secure by Letters Patent, is—

1. In a meat-chopping machine, the combination with suitable standards, of a power-shaft journaled in the upper ends thereof, wheels on the ends of said power-shaft, one of said wheels carrying a segmental toothed rack-bar on the inner face of its rim, a lever pivoted to the adjacent standard beneath said last-named wheel, a pinion carried by said lever and adapted to mesh with the teeth on said segment, means for supporting said pinion in and out of engagement with said segment, means for revolving said pinion, a rocking knife-frame, pitman-rods connecting said knife-frame with the wheels on the power-shaft, arms projecting from said knife-frame toward said standards, a transverse rod connecting said projecting arms, a transverse rock-shaft journaled in said standards, and an upward-extending arm on said rock-shaft with a seat at its upper end for the reception of the said transverse rod, substantially as set forth.

2. In a meat-chopping machine, the combination with a suitable base, and a transverse worm-shaft supported on said base, of a wide flat annulus supported above said base on upright antifriction-wheels, said annulus having downward-extending spokes and a central hub, a meat-block supported upon said annulus, a vertical shaft keyed to said hub, a housing supported beneath said hub by arms extending to and secured to said base, said housing having open sides, closed ends and top and bottom longitudinal slots or channels, a worm-wheel suspended from the spokes of said annulus, and in engagement with the worm on the said transverse shaft, upper and lower sliding blocks, movable in the slots or channels of the housing and vertically perforated for the passage of said vertical shaft therethrough, an eccentric-wheel journaled on said shaft within said housing between said upper and lower sliding blocks, a pinion rigid with said eccentric-wheel journaled on said vertical shaft just above the lower sliding block, a pinion keyed to the lower end of said vertical shaft, just below the lower sliding block, a short vertical shaft journaled in said lower sliding block, a pinion on the lower end of this shaft in mesh with the pinion on the lower end of the first-named vertical shaft, and another pinion on the upper end of the short vertical shaft in mesh with the pinion on the eccentric-wheel, substantially as set forth.

3. In a meat-chopping machine, the combination with suitable standards of a power-shaft journaled in the upper ends thereof, wheels on the ends of said power-shaft, one of said wheels carrying a segmental toothed rack-bar on the inner face of its rim, a lever pivoted to the adjacent standard beneath said last-named wheel, a pinion carried by said lever and adapted to mesh with the teeth on said segment, means for supporting said pinion in or out of engagement with said segment, means for revolving said pinion, guides secured to said standards and formed with arc-shaped slots, a rocking knife-frame, pitman-rods connecting said knife-frame with the wheels on the power-shaft, a transverse rod movable within the slotted guides, arms connecting said rod with said knife-frame, a transverse rock-shaft journaled in said standards, and an upward-extending arm on said rock-shaft with a seat at its upper end for the reception of the said transverse rod of the knife-frame, substantially as set forth.

In testimony that I claim the foregoing I have hereunto set my hand, at Milwaukee, in the county of Milwaukee and State of Wisconsin, in the presence of two witnesses.

OSCAR KIRSTEN.

Witnesses:
H. G. UNDERWOOD,
ADELE J. DOELGER.